US012633556B2

(12) United States Patent
D'Anzi

(10) Patent No.: US 12,633,556 B2
(45) Date of Patent: May 19, 2026

(54) POWER SUPPLY SYSTEM

(71) Applicant: ARCO FUEL CELLS S.R.L.,
Medicina (IT)

(72) Inventor: Angelo D'Anzi, Medicina (IT)

(73) Assignee: ARCO TECHNOLOGIES S.R.L.,
Granarolo Dell'Emilia (IT)

( * ) Notice: Subject to any disclaimer, the term of this
patent is extended or adjusted under 35
U.S.C. 154(b) by 297 days.

(21) Appl. No.: 17/778,509

(22) PCT Filed: Nov. 26, 2020

(86) PCT No.: PCT/IB2020/061181
§ 371 (c)(1),
(2) Date: May 20, 2022

(87) PCT Pub. No.: WO2021/105921
PCT Pub. Date: Jun. 3, 2021

(65) Prior Publication Data
US 2022/0416267 A1 Dec. 29, 2022

(30) Foreign Application Priority Data

Nov. 28, 2019 (IT) ........................ 102019000022389

(51) Int. Cl.
*H01M 8/04858* (2016.01)
*H01M 8/04537* (2016.01)
(52) U.S. Cl.
CPC ..... *H01M 8/0488* (2013.01); *H01M 8/04559*
(2013.01); *H01M 8/04619* (2013.01); *H01M*
*8/04626* (2013.01)

(58) Field of Classification Search
CPC ........... H01M 8/0488; H01M 8/04559; H01M
8/04619; H01M 8/04626; H02J 7/007182;
(Continued)

(56) References Cited

U.S. PATENT DOCUMENTS

2003/0113600 A1 6/2003 Wardrop et al.
2005/0142407 A1* 6/2005 Fuller ............... H01M 8/04228
429/432
(Continued)

FOREIGN PATENT DOCUMENTS

EP 2963761 A1 1/2016
JP 2008538650 A 10/2008
(Continued)

OTHER PUBLICATIONS

English translation of KR20150072592A (Year: 2015).*
(Continued)

*Primary Examiner* — Ula C Ruddock
*Assistant Examiner* — Sarika Gupta
(74) *Attorney, Agent, or Firm* — SHUTTLEWORTH &
INGERSOLL, PLC; Timothy J. Klima

(57) ABSTRACT

A power supply system including a stack of fuel cells, a
device for regulating the voltage at the poles of the stack
which includes a resistive load connected between the poles
of the stack for generating a voltage drop between them and
a controlled switch inserted in series with the resistive load,
which can be actuated between an open configuration and a
closed configuration.

19 Claims, 2 Drawing Sheets

(58) Field of Classification Search
     CPC ......... H02J 7/34; H02J 2300/30; Y02E 60/50;
                                        Y02E 60/10; G01R 19/165
     See application file for complete search history.

(56) References Cited

U.S. PATENT DOCUMENTS

| | | | |
|---|---|---|---|
| 2011/0140664 A1 | 6/2011 | Aradachi et al. | |
| 2016/0159492 A1 | 6/2016 | Filangi et al. | |
| 2018/0026463 A1* | 1/2018 | Berg ................... | H01M 8/0488 |
| | | | 320/101 |

FOREIGN PATENT DOCUMENTS

| | | | |
|---|---|---|---|
| JP | 2011154926 A | | 8/2011 |
| JP | 201737803 A | | 2/2017 |
| KR | 20150072592 A | * | 6/2015 |
| WO | 2012134442 A1 | | 10/2012 |

OTHER PUBLICATIONS

International Search Report and Written Opinion dated Mar. 4, 2021 from counterpart International Patent Application No. PCT/IB2020/061181.
Japanese Office Action dated Nov. 22, 2024 from counterpart Japanese App No. 2022-532036.

* cited by examiner

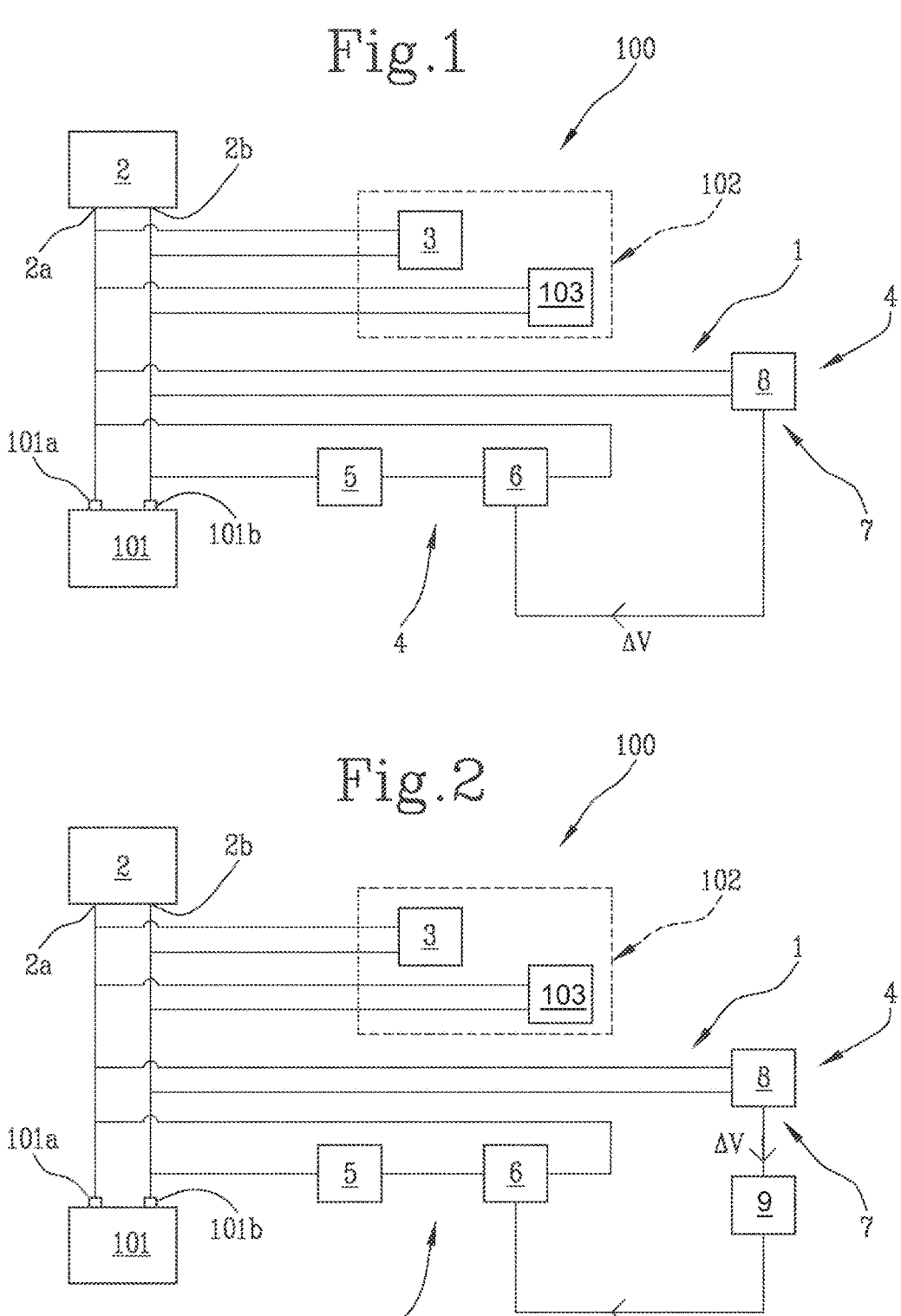

POWER SUPPLY SYSTEM

This application is the National Phase of International Application PCT/IB2020/061181 filed Nov. 26, 2020 which designated the U.S.

This application claims priority to Italian Patent Application No. 102019000022389 filed Nov. 28, 2019, which application is incorporated by reference herein.

TECHNICAL FIELD

This invention relates to a power supply system and in particular a power supply system, starting from an electricity generating system based on fuel cells, suitable for the charging of batteries, for example lithium batteries.

BACKGROUND ART

The fuel cell is an electricity generating device which; schematically, directly combines hydrogen and oxygen. These two reagents are suitably conveyed into a stack of fuel cells, that is to say, into a series of plates made of suitable material separated by a suitable catalysing membrane. The reagents, flowing inside suitable flow channels made on the surfaces of the plates, each on one side of the catalysing membrane, combine in such a way as to generate water vapour and a flow of electrons which is an electric current and which determines a voltage at the poles of the stack.

This voltage is not regulated and may adopt very variable values and depending also on the output current absorbed by the stack, as a function of the so-called polarization curve of the stack or of the fuel cell, an example of which is illustrated in FIG. 3.

In addition to the stack, the electricity generating system comprises the so-called balance of plant (BOP) which is formed by the further devices necessary for correct operation of the fuel cells. The BOP, which absorbs a certain quantity of current supplied by the stack, comprises; for example, the ventilation system for pumping the air inside the stack and a series of valves for the hydrogen and for the system for cooling the cells.

The electrical voltage measured at the poles of the stack may have, as mentioned, a large variability as a function of the electrical current required for the stack. The output voltage of the fuel cells, following the characteristic polarization curve, may, for example, reduce by half; become a third or even less with respect to the open circuit voltage, that is, the voltage in the absence of an output load.

As may be noted in FIG. 3, the electrical voltage drop at the poles of the stack does not have a perfectly linear trend with the load applied (that is, with the current absorbed); a same variation of the load, at a predetermined voltage, produces a lowering of the voltage greater than that found at a lower voltage.

In other words, if a given load variation is applied to the cells when the stack has an open circuit, it generates a voltage drop significantly greater than when a previous load is active on the stack.

A lithium ion battery pack, hereinafter referred to also merely as a battery or lithium battery, typically consists of a series of individual elements whose maximum and minimum nominal voltages are dependent on the particular chemical used in the battery.

For each element of the battery there is a maximum applicable voltage, which, multiplied by the number of elements inside the battery pack, provides the maximum electrical voltage applicable to the pack itself, for example during recharging.

The voltage applicable to the lithium battery must therefore remain within precise ranges.

An overvoltage at the poles of the battery could, for example, result in damage to the battery or having very high currents inside the lithium battery with consequent overheating and risk of fire or explosion.

The connection of the stack, at least to the battery pack, therefore requires particular intermediate devices which can regulate the voltage at the poles of the fuel cells and manage the relative current.

The prior art connecting devices use a suitable active electronic circuit, for example a DC/DC power converter, interposed between the stack and the battery pack for regulating the voltage of the fuel cell to that acceptable by the lithium battery pack.

Moreover, in general, the DC/DC converter only allows the stack to be interfaced at a load which requires regulated voltage but if a battery pack is also connected, a suitable battery charger is also necessary which, taking as input the voltage regulated at the output from the DC/DC, further regulates the charge on the batteries.

Patent document US2018026463A1 illustrates a power supply system wherein a so-called boost converter is used to adjust the voltage of the fuel cell to the one acceptable by the lithium battery pack. Despite how simple the above-mentioned system can be, the boost converter has, however, considerable complexity and costs.

In general, the device interposed between the stack and the battery pack, for example the DC/DC converter, to which reference is made, meaning any active device or electronic circuit, transforms the output voltage from the fuel cells, accepting the considerable variations over time, provides a substantially stabilised voltage.

The DC/DC converter must be able to control the entire current and the relative power which can be transmitted to the battery pack and to the relative load connected to it.

In the case of considerable outputs, in the order of thousands or tens of thousands of watts, the complexity of such a device, and firstly the related cost, can reach respectively very high values.

Moreover, the DC/DC converter has an efficiency which is unlikely to reach 85% so a part of the energy is lost in the form of heat which must be dissipated in the converter by suitable dissipaters or even liquid cooling systems which increase their size and weight.

Another problem linked to the power converters is that of electromagnetic irradiation, caused by the use of active power switching components such as MOSFETs or IGBTs which, during the switching, generate significant electromagnetic disturbances which must therefore be suitably screened.

The DC/DC converters available on the market are typically also able to manage the standard battery voltages, that is to say, for example, nominal 24V or 36V or 48V or 96V.

Considering the fact that each battery pack comprises, as mentioned, a plurality of individual elements in series, the users must therefore use a predetermined number of elements which adversely affects the possibility of choosing a desired number of elements unless a dedicated DC/DC converter is developed or customized.

Moreover, since the DC/DC power converters can trigger sparks in their operation, they cannot be used close to inflammable unless there are adequate countermeasures (see, for example, ATEX standards).

An alternative solution to the DC/DC converter, designed specifically for an environment with an explosion risk which cannot be adequately ventilated, such as an aircraft, is described and illustrated in patent document US2016159492A1.

As illustrated in particular in the drawing of patent document US2016159492A1 and described in sections 43-48 thereof, in place of the DC/DC converter, use is schematically made of a battery charger 29 interposed between the fuel cell and the battery; in practice, by using a system of contacts, energy is supplied to the battery charger which, in turn, supplies and charges the battery with a suitable charging curve. In that way, the fuel cell is never and in no case directly connected to the battery for the above-mentioned reasons.

It should be noted that not even the battery charger can be powered at the input with a non-regulated voltage like that of a fuel cell, so the system according to patent US2016159492A1 comprises a resistor 34, which is always connected in parallel to the battery charger, to bring the voltage at the output from the cell to an acceptable value for the battery charger.

DISCLOSURE OF THE INVENTION

In this context, the main aim of the invention is to overcome the above-mentioned drawbacks.

An aim of the invention is to provide a power supply system based on fuel cells which is simpler than the prior art systems.

An aim of the invention is to provide a power supply system based on fuel cells which can also be used for charging batteries, for example lithium battery having, preferably, any number of elements.

An aim of the invention is to provide a power supply system designed also for charging lithium batteries which has an operating temperature that is lower than that of traditional solutions.

An aim of the invention is to provide a power supply system also for charging batteries having reduced electromagnetic emissions.

BRIEF DESCRIPTION OF DRAWINGS

Further features and advantages of this invention are more apparent in the following non-limiting description of a preferred but non-exclusive embodiment of a power supply, in which:

FIG. 1 illustrates a block diagram of a technical system of a first embodiment of a power supply system according to the invention;

FIG. 2 illustrates a block diagram of a technical system of a second embodiment of a power supply system according to the invention;

DETAILED DESCRIPTION OF PREFERRED EMBODIMENTS OF THE INVENTION

Figure 3:
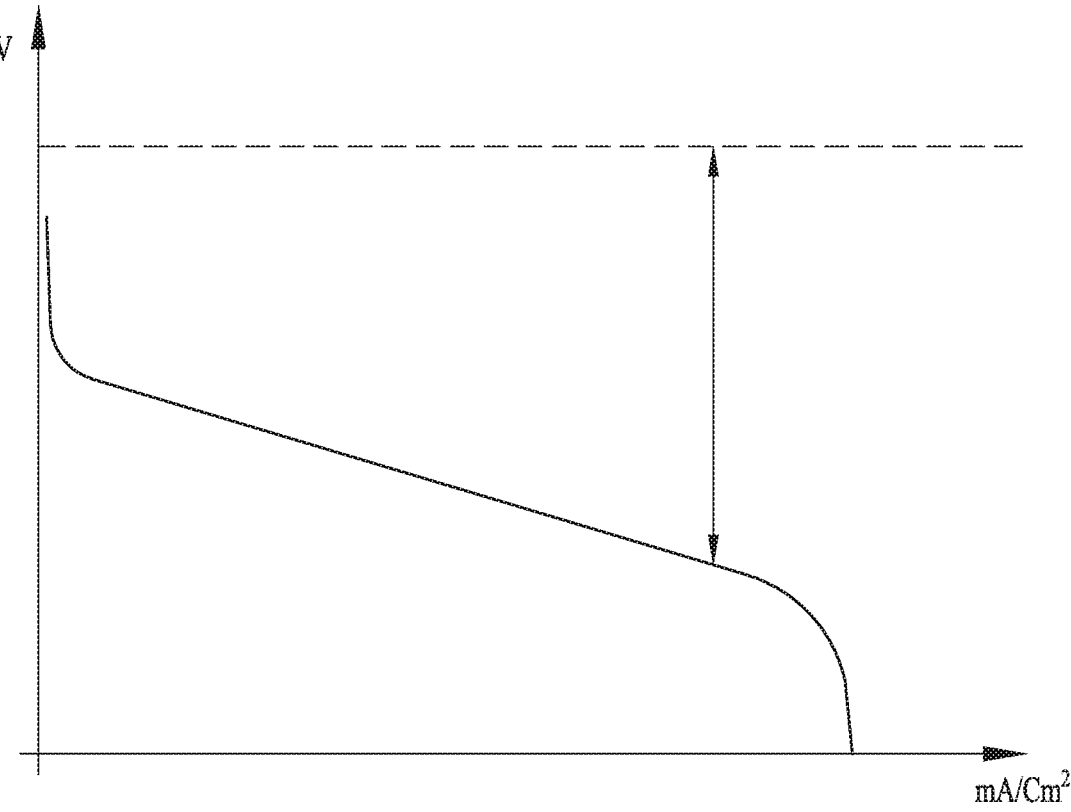
FIG. 3 illustrates an example of a polarization curve of a fuel cell.

With particular reference to FIGS. 1 and 2, the numeral 100 denotes a technical system according to the invention.

The technical system 100 comprises a battery pack, schematically illustrated with a block 101 and an electrical load, schematically illustrated with a block 102, powered by the battery pack 101.

The battery pack 101 comprises a plurality of individual rechargeable and suitably connected basic elements of substantially known type, not illustrated; the battery pack 101 has a positive pole 101$a$ and a negative pole 101$b$.

The number of elements inside the lithium battery pack 101 provides the maximum voltage applicable to the battery pack for example during charging or recharging of the battery pack.

Preferably, the individual basic elements and, therefore, also the battery pack, are of the lithium ions type.

The system 100 comprises a power supply system, generically labelled 1, for powering, that is, charging the battery pack 101 and/or for powering the electrical load 102.

The electrical load 102 is therefore preferably powered by the battery pack 101 and/or by the power supply system 1.

The supply system 1 comprises an electricity generating system comprising a stack of fuel cells, of substantially known type and schematically illustrated with a block 2, having a positive pole 2$a$ and a negative pole 2$b$, also referred to as "terminals" of the stack, and forming a plurality of fuel cells not illustrated.

Schematically, the stack 2 allows a direct combination of hydrogen and oxygen which, flowing inside suitable flow channels, combine in such a way as to generate water vapour and a flow of electrons which determine a voltage V at the terminals of the stack, that is, between the positive pole 2$a$ and the negative pole 2$b$.

The electricity generating system also comprises auxiliary components, schematically illustrated with a block 3, in communication with the stack 2 of fuel cells for the operation of the stack 2.

These auxiliary components constitute the so-called BOP (Balance of plant) of the stack 2 to which reference is made hereinafter.

The BOP of the stack 2 is substantially known and formed by the further devices necessary for the correct automatic operation of the fuel cells. The BOP, which absorbs a certain quantity of current generally supplied by the stack 2, that is, it is preferably powered by the stack itself, comprises, for example, a ventilation system for pumping air inside the stack 2 and a series of solenoid valves for the hydrogen and for a system for cooling fuel cells of the stack 2.

The electrical load 102 comprises both the BOP 3 and a working load, schematically illustrated with a block 103, which may be powered by the stack 2 and/or by the battery pack 101.

The type of working load depends on the type of technical system.

In a automotive application, the working load 103 may be, for example, defined by a motor for automotive transport.

In a preferred application according to the invention, the working load is defined by the traction system of a lift truck and by at least part of the relative actuators.

The supply system 1 comprises a device for regulating the voltage between the positive pole 2$a$ and the negative pole 2$b$ of the stack 2, generally labelled 4.

In other words, the regulating device 4 regulates, in practice, the voltage at the poles of the battery pack 101.

The regulating device 4 comprises a resistive load, schematically illustrated with a block 5, connected to the positive pole 2$a$ and to the negative pole 2$b$ of the stack 2 for generating a voltage drop between them.

The resistive load 5 comprises at least one electrical dissipating resistance designed to absorb and dissipate electric current.

The resistive load and/or the above-mentioned resistance is preferably sized according to the number of individual basic elements of the battery pack and/or the number of fuel cells constituting the stack 2.

With reference to the polarization curve of a fuel cell illustrated for example in FIG. 3, in which, as known, the X-axis shows the current density (mA/cm$^2$) and the Y-axis shows the cell voltage (V), it should be noted that the application of a resistive load at the terminals of the cell, calling a current, causes a voltage drop at the terminals of the cell.

The regulating device 4 comprises at least one controlled switch, schematically represented as a block 6, inserted in series with the resistive load 5, which can be operated between an open configuration and a closed configuration.

The resistive load 5 and the controlled switch 6 form a series defining a branch of the regulating device 4 positioned between the positive pole 2a and the negative pole 2b of the stack 2 and which is able to switch between the open configuration, at which the resistive load 5 is not powered by the stack 2, and the closed configuration, at which the resistive load 5 is powered by the stack 2 and, in practice, causes a drop in potential at the terminals.

The technical system 100 therefore comprises, schematically, the power supply system 1, the battery pack 101, comprising a plurality of individual elements powered by the stack 2, and an electrical load 102, also powered by the stack 2, wherein the electrical load 102 and the battery pack 101 are connected to the stack 2 in parallel with a series comprising the resistive load 5 and the controlled switch 6.

Preferably, the controlled switch 6 is powered by the battery pack 101.

The regulating device 4 comprises a control device 7, in communication with the controlled switch 6 and with the positive and negative poles 2a, 2b of the stack 2. The control device 7 comprises a comparator, schematically illustrated as a block 8, for calculating a voltage error ΔV as the difference between the voltage value V measured between the positive pole 2a and the negative pole 2b at the poles of the stack 2 and a predetermined maximum voltage value V$_{max}$.

The predetermined maximum voltage V$_{max}$ is preferably a function of the number of fuel cells which make up the stack 2.

Considering the technical system 100, in accordance with an aspect of the invention, the predetermined maximum voltage value V$_{max}$ is preferably a function of the number of individual basic elements of the battery pack 101, that is, of the maximum voltage applicable to the battery pack 101 during the charging or recharging of the battery pack.

According to a preferred embodiment, the predetermined maximum voltage value V$_{max}$ corresponds to the maximum voltage value applicable to the battery pack 101 during charging or recharging of the battery pack.

The control device 7 is configured for actuating the controlled switch 6 between the open configuration and the closed configuration and vice versa as a function of the voltage error ΔV calculated by the comparator 8.

According to an embodiment, the comparator 8 may comprise a voltage sensor.

According to an embodiment, the comparator 8 may comprise a current sensor in combination with or as an alternative to a voltage sensor.

According to the invention, the regulating device 4 basically comprises the resistive load 5 connected to the positive pole 2a and to the negative pole 2b for generating a voltage drop between them, by the controlled switch 6 inserted in series with the resistive load 5, by the device 7 for controlling the controlled switch 6.

With reference to FIG. 1, according to the embodiment illustrated by way of example, the controlled switch 6 is preferably defined by a voltage controlled relay.

The relay 6 in communication with the comparator 8 and is actuated, between the respective open and closed configurations, directly by the voltage error ΔV which is, precisely, an analogue voltage signal.

With reference to FIG. 2, according to the embodiment illustrated by way of example, the control device 7 comprises a computerised command and control unit, schematically represented as a block 9, in communication with the comparator 8 to receive the voltage error ΔV as input.

The computerised unit 9 is configured for generating a digital control signal S, as a function of the voltage error ΔV, and actuating the controlled switch 6 by means of the signal S.

Advantageously, the regulating device 4 may comprise a plurality of voltage sensors in communication with the computerised unit 9 for determining the signal S for activating the controlled switch 6.

According to this embodiment, the controlled switch 6 may be a digitally controlled switch.

Preferably, the computerised unit 9 is configured for generating the control signal S as a function of the number of individual elements of the battery pack 101.

Preferably, the computerised unit 9 is configured for generating the control signal S as a function of the number of fuel cells of the stack 2.

A preferred application of a technical system 100 as described is in lift trucks.

A lift truck of substantially known type generally comprises a technical system 100 as described.

In fact, the lift truck generally comprises an electrical traction system and a plurality of electric actuators.

The electrical traction system and the electric actuators define the working load of the technical system 100.

The lift truck comprises a battery pack which corresponds to the battery pack 101 of the technical system 100.

The lift truck comprises a stack of fuel cells, corresponding to the stack 2, and the respective BOP, corresponding to the auxiliary components 3.

The BOP of the lift truck, the traction system and the actuators therefore define the electrical load for the stack and the battery pack of the lift truck.

A method for controlling the technical system 100, aimed, for example, at powering the electrical load 102 and maintaining the charge of the battery pack 101, comprising the steps of:

measuring the voltage value V between the positive pole 2a and the negative pole 2b of the stack 2 of fuel cells;

calculating the voltage error ΔV between the voltage value V measured and the predetermined maximum voltage Vmax value corresponding preferably to the maximum permissible voltage value of the battery pack 101;

actuating the controlled switch 6 to move it to the closed configuration if the voltage error ΔV is positive;

actuating the controlled switch 6 to move it to the open configuration if the voltage error ΔV is negative.

The output voltage from the stack 2 is supplied directly at the input to the battery pack 101 suitably modulated by the resistor 5.

The operation of the power supply system 1 can therefore be summarised with reference also to the polarization curve of FIG. 3. At the moment of a setting up of the system for generating electricity, comprising the stack 2 and the auxiliary components 3, during a transient step, until the working load 103 is active and the consumption of the BOP 3 is at a minimum value sufficient for activating the stack 2, the output voltage V of the fuel cell, measured by the comparator 8, will be the maximum possible and dose to the open circuit voltage value of the stack 2, typically, a volt per cell of the stack, that is, significantly greater than Vmax.

In these conditions, the comparator 8 measures, for example on the basis of an algorithm, a positive voltage error ΔV between the output voltage of the stack 2 and the predetermined maximum value Vmax, for simplicity corresponding to the maximum value Vmax permitted by the battery pack 102.

The comparator 8 sends this information to the control device 7 which requires a closing of the controlled switch 6 thus diverting a flow of current on the resistive load 5.

The regulating device 4 therefore allows the instantaneous absorption of a predetermined quantity of current which will have, as a result, an immediate reduction of the voltage V at the terminals of the stack 2 and therefore at the terminals of the battery pack 101.

The battery pack 101 is recharged directly, by transfer, from the stack 2 without the interposition of other connecting devices or electronic circuits, nor converters or battery chargers.

With reference to the prior art described in the above-mentioned patent document US2016159492A1, the solution according to the invention makes the battery charger 29 and the contactors 40 and 36 unnecessary and not even the diode fundamental for the system described.

As soon as the current starts to increase the working load 103 and whilst the BOP 3 moves to steady state, there is a further reduction in the voltage at the terminals of the stack 2 which may be again measured by the comparator 8.

As soon as the total electrical load 102 is such as to reduce the voltage V at the terminals of the stack 2 below the maximum value Vmax acceptable by the lithium battery 2, the control device 7 disconnects the resistive load 5 using the controlled switch 6.

As illustrated in FIGS. 1 and 2, the controlled switch 6 may be activated directly by the comparator 8 or by means of a computerised unit 9.

The power supply system 1 has important advantages.

The absence of active switching components avoids the generation of any electromagnetic noise, gives the system high efficiency and significantly reduces the costs.

The regulating device intervenes, in practice, only during the switching on transient and in those rare cases in which the working load tends to move towards zero.

These events are, in effect, marginal in almost all of the applications and in particular in the applications of lift trucks. On the other hand, the current systems are always active between the stack and the battery pack, adversely affecting efficiency continuously.

Cooling the additional resistive load is much easier or even unnecessary.

The power supply system as described above may be used to power any battery pack formed by an arbitrary and desired number of individual elements.

A suitable choice of the resistive load and of the comparator allows any combination between the number of fuel cells of the stack and the number of elements of the battery pack.

The cost of the regulating device is reduced to practically only the cost of the resistive load, of the relative command and of the voltage comparator as no other device is necessary.

The current which must be managed by the controlled switch is only a small fraction of the nominal current of the stack.

Another advantage is the simplification of the components which are not dimensioned over the entire plant but simply on the starting transient.

Moreover, since only some components are actually necessary with respect to or tens or hundreds constituting a DC/DC power converter or other devices such as a battery charger, the saving in terms of volume and weight is also evident.

The above-mentioned advantages are similarly achieved during operation with any type of battery.

The invention claimed is:

1. A power supply system, comprising:
   an electricity generating system consisting of a single stack of fuel cells comprising a plurality of fuel cells and having a positive pole and a negative pole;
   a regulating device for regulating a voltage between said positive pole and said negative pole, said regulating device consisting of:
   a resistive load connected between said positive pole and negative pole to generate a voltage drop between said positive pole and negative pole;
   a controlled switch inserted in series with said resistive load between said positive pole and negative pole and which is actuatable between an open configuration and a closed configuration;
   a control device in communication with the controlled switch and comprising a comparator for calculating a voltage error as a difference between a voltage value measured between said positive pole and said negative pole at terminals of the stack and a predetermined maximum voltage value, said control device being configured for actuating said controlled switch between said open configuration and said closed configuration and vice versa as a function of said voltage error.

2. The power supply system according to claim 1, wherein said predetermined maximum voltage value is a function of a number of fuel cells which make up said stack.

3. The power supply system according to claim 1, wherein said predetermined maximum voltage value is a function of a number of elements of a battery pack rechargeable via said power supply system.

4. The power supply system according to claim 1, wherein said comparator comprises a voltage sensor.

5. The power supply system according to claim 1, wherein said comparator comprises a current sensor.

6. The power supply system according to claim 1, wherein said control device comprises a computerized command and control unit in communication with said comparator and configured for generating a control signal as a function of said voltage error and actuating said controlled switch via said control signal.

7. The power supply system according to claim 1, wherein said controlled switch is defined by a voltage controlled relay in communication with said comparator, said relay being actuated, between the respective open and closed configurations, by said voltage error.

8. A technical system comprising:
   a power supply system, comprising:

an electricity generating system comprising a single stack of fuel cells comprising a plurality of fuel cells and having a positive pole and a negative pole;

a regulating device for regulating a voltage between said positive pole and said negative pole, said regulating device consisting of:

a resistive load connected between said positive pole and negative pole to generate a voltage drop between said positive pole and negative pole;

a controlled switch inserted in series with said resistive load between said positive pole and negative pole and which is actuatable between an open configuration and a closed configuration;

a control device in communication with the controlled switch and comprising a comparator for calculating a voltage error as a difference between a voltage value measured between said positive pole and said negative pole at terminals of the stack and a predetermined maximum voltage value, said control device being configured for actuating said controlled switch between said open configuration and said closed configuration and vice versa as a function of said voltage error;

a battery pack comprising a plurality of individual elements powered by the stack of fuel cells, an electrical load also powered by the stack of fuel cells and/or by the battery pack, said electrical load and said battery pack being connected to said stack of fuel cells in parallel with a series comprising said resistive load and said controlled switch;

wherein the positive and negative poles of the stack of fuels cells are directly connected to positive and negative poles of the battery pack, respectively, without further devices positioned in series therebetween.

9. The technical system according to claim 8, wherein said predetermined maximum value corresponds to a maximum voltage value permitted by the battery pack.

10. The technical system according to claim 8, wherein said computerized command and control unit is configured to generate said control signal as a function of a number of individual elements of the battery pack.

11. The technical system according to claim 8, wherein said computerized command and control unit is configured to generate said control signal as a function of a number of fuel cells of the stack of fuel cells.

12. The technical system according to claim 8, wherein said electrical load comprises a working load powered by said stack of fuel cells.

13. The technical system according to claim 8, wherein said electrical load comprises an auxiliary component in communication with the stack of fuel cells for operation of the stack of fuel cells.

14. The technical system according to claim 8, wherein said battery pack is a lithium battery pack.

15. A control method for controlling a technical system, comprising the steps of:

providing a technical system comprising:

a power supply system, comprising:

an electricity generating system consisting of a single stack of fuel cells comprising a plurality of fuel cells and having a positive pole and a negative pole;

a regulating device for regulating a voltage between said positive pole and said negative pole, said regulating device consisting of:

a resistive load connected between said positive pole and negative pole to generate a voltage drop between said positive pole and negative pole;

a controlled switch inserted in series with said resistive load between said positive pole and negative pole and which is actuatable between an open configuration and a closed configuration;

a control device in communication with the controlled switch and comprising a comparator for calculating a voltage error as a difference between a voltage value measured between said positive pole and said negative pole at terminals of the stack and a predetermined maximum voltage value, said control device being configured for actuating said controlled switch between said open configuration and said closed configuration and vice versa as a function of said voltage error;

a battery pack comprising a plurality of individual elements powered by the stack of fuel cells, an electrical load also powered by the stack of fuel cells and/or by the battery pack, said electrical load and said battery pack being connected to said stack of fuel cells in parallel with a series comprising said resistive load and said controlled switch;

measuring the voltage value between the positive pole and the negative pole of the stack of fuel cells;

calculating the voltage error between the voltage value measured between the positive pole and the negative pole of the stack of fuel cells and the predetermined maximum voltage value corresponding to the maximum permissible voltage value of the battery pack;

actuating said controlled switch to move to the closed configuration if said voltage error is positive.

16. The control method according to claim 15, and further comprising the following steps:

actuating said controlled switch to move to the open configuration if said voltage error is negative.

17. A recharging method for recharging a battery pack from a stack of fuel cells, said recharging method comprising:

a step of directly powering the battery pack from the stack of fuel cells and a step of regulating a voltage between a positive pole and a negative pole of the stack of fuel cells, said regulating step being performed exclusively via a regulating device consisting of a resistive load connected to said positive pole and negative pole for generating a voltage drop between said positive pole and negative pole and a controlled switch inserted in series with said resistive load between said positive pole and negative pole and which is actuatable between an open configuration and a closed configuration;

a step of controlling the controlled switch as a function of a voltage error calculated as a difference between a voltage value measured between said positive pole and said negative pole at terminals of the stack of fuel cells and a predetermined maximum voltage value permitted by the battery pack;

setting up a system for generating electricity, comprising the stack of fuel cells and an electricity generating system, during a transient step until a working load is active and a consumption of a balance of plant is at a minimum value sufficient for activating the stack of fuel cells and an output voltage of the stack of fuel cells, measured using a comparator, is at a maximum and close to an open circuit voltage value of the stack of fuel cells and greater than the predetermined maximum voltage value;

determining, using the comparator, a positive voltage error between the output voltage of the stack of fuel cells and the predetermined maximum voltage value;

using the positive voltage error to close the controlled switch and divert a flow of current on the resistive load;

thereby allowing an instantaneous absorption of a predetermined quantity of current which will have, as a result, an immediate reduction of the voltage between the terminals of the stack of fuels cells and at the terminals of the battery pack.

18. The power supply system according to claim 1, wherein the control device comprises a computerized command and control unit, in communication with the comparator, to receive the voltage error as an input;

wherein the computerized command and control unit is configured for generating a digital control signal, as a function of the voltage error, and actuating the controlled switch with the signal.

19. The control method according to claim 15, and further comprising providing that the control device comprises a computerized command and control unit, in communication with the comparator, to receive the voltage error as an input;

wherein the computerized command and control unit is configured for generating a digital control signal, as a function of the voltage error, and actuating the controlled switch with the signal.

\* \* \* \* \*